United States Patent
Mei et al.

(10) Patent No.: US 8,211,825 B2
(45) Date of Patent: Jul. 3, 2012

(54) METHANOL OXIDATION CATALYST

(75) Inventors: Wu Mei, Yokohama (JP); Taishi Fukazawa, Fuchu (JP); Itsuko Mizutani, Yokohama (JP); Tsuyoshi Kobayashi, Kawasaki (JP); Yoshihiko Nakano, Yokohama (JP); Mina Farag, Fremont, CA (US); Shinji Aoki, Fremont, CA (US); Yi-Qun Li, Fremont, CA (US)

(73) Assignees: Kabushiki Kaisha Toshiba, Tokyo (JP); Intematix Corporation, Fremont, CA (US)

(*) Notice: Subject to any disclaimer, the term of this patent is extended or adjusted under 35 U.S.C. 154(b) by 67 days.

(21) Appl. No.: 12/401,255

(22) Filed: Mar. 10, 2009

(65) Prior Publication Data

US 2009/0247401 A1 Oct. 1, 2009

Related U.S. Application Data

(63) Continuation of application No. PCT/JP2008/066498, filed on Sep. 8, 2008.

(30) Foreign Application Priority Data

Mar. 26, 2008 (JP) ................................. 2008-081629

(51) Int. Cl.
*B01J 23/42* (2006.01)
*B01J 23/58* (2006.01)
*B01J 23/00* (2006.01)
*B01J 23/20* (2006.01)

(52) U.S. Cl. ........ 502/339; 502/330; 502/334; 502/337; 502/349; 502/353; 502/354

(58) Field of Classification Search .......... 502/300–355; 420/466, 468
See application file for complete search history.

(56) References Cited

U.S. PATENT DOCUMENTS

| | | | | |
|---|---|---|---|---|
| 3,506,494 A | | 4/1970 | Adlhart | |
| 4,202,934 A | * | 5/1980 | Jalan | 429/498 |
| 4,207,169 A | * | 6/1980 | Courty et al. | 208/124 |
| 4,316,944 A | * | 2/1982 | Landsman et al. | 429/498 |
| 5,183,713 A | * | 2/1993 | Kunz | 429/452 |
| 5,496,532 A | * | 3/1996 | Monzen et al. | 423/584 |
| 6,156,211 A | * | 12/2000 | Gonzalez-Martin et al. | 204/157.9 |
| 2007/0254806 A1 | | 11/2007 | Mei et al. | |
| 2008/0233465 A1 | | 9/2008 | Mizutani et al. | |
| 2009/0029219 A1 | | 1/2009 | Fukazawa et al. | |
| 2009/0081391 A1 | | 3/2009 | Mei et al. | |
| 2009/0082198 A1 | | 3/2009 | Mei et al. | |

FOREIGN PATENT DOCUMENTS

| | | |
|---|---|---|
| JP | 2004-281177 | 10/2004 |
| JP | 2004281177 A | 10/2004 |
| JP | 2006-179445 | 7/2006 |
| JP | 2006179445 A | 7/2006 |

* cited by examiner

*Primary Examiner* — Stanley Silverman
*Assistant Examiner* — Anthony J Zimmer
(74) *Attorney, Agent, or Firm* — Oblon, Spivak, McClelland, Maier & Neustadt, L.L.P.

(57) ABSTRACT

A methanol oxidation catalyst comprises a material of composition:

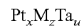

$Pt_x M_z Ta_u$ in which Pt is platinum, Ta is tantalum, M is an element includes at least one selected from the group consisting of V (vanadium), W (tungsten), Ni (nickel) and Mo (molybdenum), x is 40 to 98 at. %, z is 1.5 to 55 at. %, and u is 0.5 to 40 at. %. To maximize catalytic activity the material is preferably in the form of nanoparticles. The values of x, z and u are selected such that the element exhibits X-ray photoelectron spectroscopy peaks derived from an oxygen bond and a metal bond in which a peak area derived from the oxygen bond is twice or less of a peak area derived from the metal bond.

32 Claims, 4 Drawing Sheets

METHANOL OXIDATION CATALYST

CROSS-REFERENCE TO RELATED APPLICATIONS

This is a Continuation Application of PCT Application No. PCT/JP2008/066498, filed Sep. 8, 2008, which was published under PCT Article 21(2) in Japanese.

This application is based upon and claims the benefit of priority from prior Japanese Patent Application No. 2008-081629, filed Mar. 26, 2008, the entire contents of which are incorporated herein by reference.

BACKGROUND OF THE INVENTION

1. Field of the Invention

The present invention relates to a methanol oxidation catalyst and a method for manufacturing the methanol oxidation catalyst.

2. Description of the Related Art

Solid polymer type fuel cells, and particularly those using an aqueous methanol solution fuel, convert chemical energy into electric power by the catalytic reaction of an electrode. Therefore, a highly active catalyst is essential to develop high-performance fuel cells. As is known the catalyst typically comprises a combination of platinum (Pt) and ruthenium (Ru).

The theoretical voltage obtained by the catalytic reaction of the electrode is 1.21V, whereas the voltage loss due to the PtRu catalyst is about 0.3V. Therefore, an anode catalyst having a higher activity (methanol oxidation activity) than that of PtRu is desired. Current PtRu anode catalysts have problems due to dissolution (elution) of Ru, and therefore, highly active methanol oxidation catalysts having a Ru-free composition are desired.

To date, studies have been made as to methanol oxidation catalysts having various composition types. For example, a method in which metals such as tungsten, tantalum and niobium are added to a PtRu catalyst is described in U.S. Pat. No. 3,506,494. Japanese Patent Applications, publication Numbers 2004-281177 (KOKAI) and 2006-179445(KOKAI), describe a sputtering process for manufacturing a catalyst. There are only a few reports as to a reduction in the amount of Ru to be added and Ru-free compositions.

In the case where the catalysts are nanoparticles, the surface electron state of the catalyst particles and the nanostructure of the particles are strongly dependent on the catalyst composition and in particular type and amount of elements. In order to obtain high activity and high stability, the type and amount of the elements and combination of the elements need to be appropriately selected. To date, studies concerning catalyst compositions and synthesis processes are insufficient and a highly stable catalyst having sufficient methanol oxidation activity has not been established.

BRIEF SUMMARY OF THE INVENTION

A methanol oxidation catalyst according to one aspect of the invention comprises a material of composition:

$$Pt_xM_zTa_u$$

in which M is an element comprising at least one selected from the group consisting of V (vanadium), W (Tungsten), Ni (Nickel) and Mo (molybdenum); x is 40 to 98 at. %; z is 1.5 to 55 at. %; and u is 0.5 to 40 at. %. To increase catalytic activity the material is preferably in the form of naroparticles. The nanoparticles can have an average particle diameter of 10 nm or less and preferably have an average particle diameter of 0.5 nm or more.

The values of x, z and u can be selected such that the element M exhibits X-ray photoelectron spectroscopy (XPS) peaks derived from an oxygen bond and a metal bond in which a peak area derived from the oxygen bond is twice or less of a peak area derived from the metal bond.

In a further embodiment a proportion of the element M is substituted with an element A in which A is at least one selected from the group consisting of Sn (tin), Hf (hafnium), Ti (titanium), Cr (chromium), Al (aluminum), Si (silicon), Nb (niobium) and Zr (zirconium). Typically the element A is contained in an amount of 80% or less of the element M.

In an alternative embodiment a proportion of the Pt is substituted with a noble metal preferably at least one selected from the group consisting of Rh (rhodium), Os (osmium), Ir (iridium), Pd (palladium), Ag (silver) and Au (gold).

The nanoparticles of methanol oxidation catalyst are advantageously supported on a conductive support material such as a carbon material or ceramic material. Preferably the support material is fibrous, tubular or coiled in form.

According to a further aspect of the invention a methanol oxidation catalyst comprises a material of composition:

$$Pt_x(M_{1-t}A_t)_zTa_u$$

In which M is an element comprising at least one selected from the group consisting of V, W, Ni and Mo; A is an element comprising at least one selected from the group consisting of Sn, Hf, Ti, Cr, Al, Si, Nb and Zr; x is 40 to 98 at. %; z is 1.5 to 55 at. %; u is of 0.5 to 40 at. %; and t is 0 to 80 at. %.

According to a yet further aspect of the invention a methanol oxidation catalyst comprises a material of composition:

$$Pt_x(M_{1-t}A_t)_zTa_u$$

where M is an element comprising at least one selected from the group consisting of V, W, Ni and Mo; A is an element comprising at least one selected from the group consisting of Rh, Os, Ir, Pd, Ag and Au; x is 40 to 98 at. %; z is 1.5 to 55 at. %; u is 0.5 to 40 at. %; and t is 0 to 80 at. %.

According to the invention a method for manufacturing the methanol oxidation catalyst comprises: providing a conductive support; maintaining a temperature of the conductive support at 400° C. or less; and depositing metal elements on to the conductive support by a sputtering or vacuum deposition to form nanoparticles of the methanol oxidation catalyst.

The method can further comprise washing the nanoparticles with an acid or alkali. Alternatively, or in addition the nanoparticles can be heat treated by for example heating the nanoparticles at a temperature of 10 to 400° C. under a oxygen partial pressure of less than 5%.

DETAILED DESCRIPTION OF THE INVENTION

The inventors have made extensive studies on the relationship between the catalytic synthesis process and composition of the catalyst, and have obtained the following results. Embodiments of the invention comprise a highly active methanol oxidation catalyst obtained by forming a metal bond between co-catalyst elements comprising i) a noble element such as Pt (platinum) and ii) an element M and Ta (tantalum). The catalyst is preferably in the form of nanoparticles and has a composition represented by formula (1). Such metal bonds may be formed, for example, by combining the element M with Pt by sputtering or vapor deposition on a conductive support maintained at a temperature of 400° C. or less.

$$Pt_xM_zTa_u \quad (1)$$

The element M is at least one element selected from the group consisting of V (vanadium), W (tungsten), Ni (Nickel) or Mo (molybdenum). Typically x is in a range 40 to 98 at. %;, z is in a range 1.5 to 55 at. %, and u is in a range 0.5 to 40 at. %.

Since Pt is quite an effective catalyst for the oxidation of hydrogen and dehydrogenation reaction of an organic fuel, it is the major catalyst element of the catalyst of the present invention. Accordingly, x is typically present in a range 40 to 98 at. %. Catalytic activity may be further enhanced by substituting a proportion of the Pt with additional metal(s). The metal(s) is preferably a noble metal such as Rh (rhodium), Os (osmium), Ir (iridium), Pd (palladium), Ag (silver) or Au (gold) since these metals are chemically very stable.

The element M and Ta serve as co-catalysts. The catalyst according to the invention which contains the elements M and Ta added to Pt, exhibits high stability and high activity. It is believed that the stability and activity of the catalyst is enhanced mainly due to the surface structure of the catalyst which results from the specific mixed state of each element and electronic states. The presence of a metal bond between the element M and Pt, and the presence of an oxygen bond of Ta are considered to be responsible for improvements in stability and activity.

Ta having an oxygen bond is difficult to be incorporated in the catalyst particle matrix. Accordingly, Ta having the oxygen bond is localized on the surface of the catalyst, and seems to be responsible for high stability and high activity. The element M often forms a metal bond as well as an oxygen bond. A part of the element M should also be localized on the surface of the catalyst. In order to obtain high activity, the peak area derived from the oxygen bond of the element M in the XPS (X-ray Photoelectron Spectroscopy) spectrum is desirably twice or less of the peak area derived from the metal bond of the element M.

Reductive reactions of V, W, Ni and Mo hardly occur when the catalyst particles are synthesized by, for example, a solution method, and alloys of these metals containing the major catalytic element (Pt) are hardly formed. Accordingly, most of the catalyst particles obtained is a mixture of Pt nanoparticles and nanoparticles of an oxide of the element M. Surface analysis of the catalyst particles synthesized by the solution method by X-ray photoelectron spectroscopy (XPS) revealed that most of the element M forms oxygen bonds.

Photoelectrons (signals) detectable by the XPS measurement are restricted to those at a depth of several nanometers or less in the vicinity of the surface of the sample. Accordingly, the element M is considered to exist as a metallic state in the region within several nanometers from the surface. Metal nanoparticles composed of the element M alone are not stable in air. Therefore, the element M and Pt may be considered to form alloy particles in the catalyst according to the invention.

Of the total signal intensity detected by XPS, the proportion of the signal from the portion close to the surface is very large. Consequently, it is highly probable that the peak area (signal) derived from the oxygen bond of the element M is larger than the peak area derived from the metal bond in the XPS spectrum when an oxide layer is formed on the surface of the catalyst nanoparticles. Accordingly, it is necessary to form a specified mixing state among Pt, the element M and Ta by optimizing the composition and production process of the catalyst in order to obtain a catalyst of high stability and high activity.

The content z of the element M is preferably in a range 1.5 to 55 at. %. The action as a co-catalyst of the element M becomes low when z is less than 1.5 at. %. On the other hand, the catalytic activity decreases when the element M is present in amounts exceeding 55 at. % since the number of the major active sites formed by Pt atoms relatively decreases. Therefore, the content z of the element M is more preferably 5 to 40 at. %.

The content u of Ta is preferably in a range 0.5 to 40 at. %. The action of Ta as a co-catalyst is lowered when the content u is less than 0.5 at. %. On the other hand, the catalytic activity decreases when Ta is contained in an amount exceeding 40 at. % since the number of the major active sites formed by Pt atoms relatively decreases. The content u of Ta is more preferably in a range 1 to 15 at. %.

In accordance with a further embodiment a proportion of the element M may be substituted with an element A to enhance the methanol oxidizing activity. The element A is at least one selected from the group consisting of Sn (tin), Hf (hafnium), Ti (titanium), Cr (chromium), Al (aluminum), Si (silicon), Nb (niobium) and Zr (zirconium). The proportion t of substitution with the element A is preferably from 0.5 to 80% of the amount of the element M. The catalytic activity may be decreased when the proportion exceeds 80%. The composition of the catalyst may be represented by the formula:

$$Pt_x(M_{1-t}A_t)_zTa_u \quad (2)$$

in which the element M is at least one selected from the group consisting of V, W, Ni and Mo, and the element A is at least one selected from the group consisting of Sn, Hf, Ti, Cr, Al, Si, Nb and Zr. x is 40 to 98 at. %, z is 2 to 30 at. %, u is 0.5 to 40 at. %, and t is 0 to 80 at. %. t represents the proportion of substitution of the element M with the element A. The content (at. %) of the element A in the entire catalyst is 0 to 45 at. %.

The element M often forms an oxygen bond rather than the metal bond in a catalyst having a composition represented by the above formula (2). For obtaining a high activity, the peak area derived from the oxygen bond of the element M shown in the XPS spectrum is desirably twice or less of the peak area derived from the metal bond of the element M.

To obtain a catalyst with both high stability and high activity it is necessary to optimize the composition and production process of the catalyst so that a specified structure of nanoparticles of the catalyst and a specified mixed electronic state are formed. The proportion of substitution t of the element M with the element A is more preferably 0 to 60 at. % in order to fully exhibit the co-catalyst action of the element A.

The methanol oxidation catalyst according to the embodiment may contain oxygen in addition to the above mentioned constituent metal elements. As hitherto described, it is highly probable that an oxide layer is formed on the surface of the catalyst and this oxide layer is believed to be responsible, at least in part, for the high activity and high stability of the catalyst. It is found that the catalytic activity is not significantly reduced when the content of oxygen is 25 at. % or less.

Moreover, the element A can comprise at least one selected from the group consisting of Mn (manganese), Fe (iron), Co (cobalt), Cu (copper) and Zn (zinc). These elements can further enhance the activity, and the content t of them is desirably 1 to 20 at. %.

The content of impurities such as P (phosphorus), S (sulfur) and Cl (chlorine) is 0.1 at. % or less. Whilst the impurity elements may be present in the process of manufacturing and treating the catalyst or a membrane electrode assembly, the deterioration of catalyst characteristics is small when the content of such impurities is 0.1 at. % cr less. Thus, the surface structure of the catalyst according to the invention can be considered to have high resistance to harsh environments.

The catalyst particles according to the embodiment are preferably in the form of nanoparticles to obtain the highest catalytic activity. The average particle diameter of the nanoparticles is desirably 10 nm or less, since the catalytic efficiency of the catalyst can be significantly decreased when the average particle diameter exceeds 10 nm. A more preferable range is from 0.5 to 10 nm. Control of the process for synthesizing the catalyst becomes difficult when the average particle diameter is less than 0.5 nm, and the cost for synthesizing the catalyst increases. While nanoparticles with an average particle diameter of 10 nm or less may be used alone, an aggregate composed of such particles (primary particles) may be used as the catalyst particles (secondary particles). The catalyst particles can be retained on a conductive support.

Figure 1:
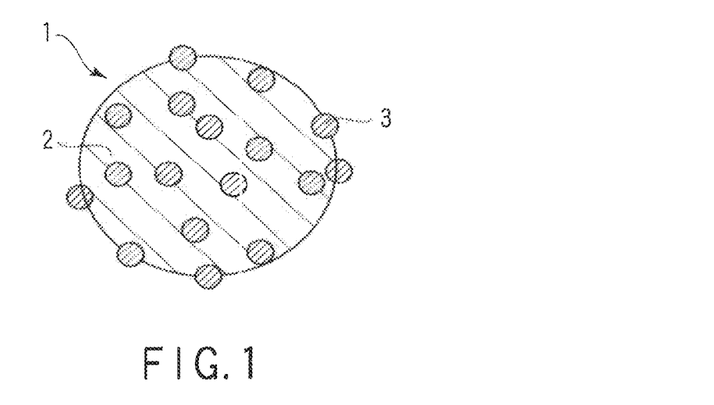
FIG. 1 is a schematic representation of a methanol oxidation catalyst according to one embodiment of the invention.
Figure 2:
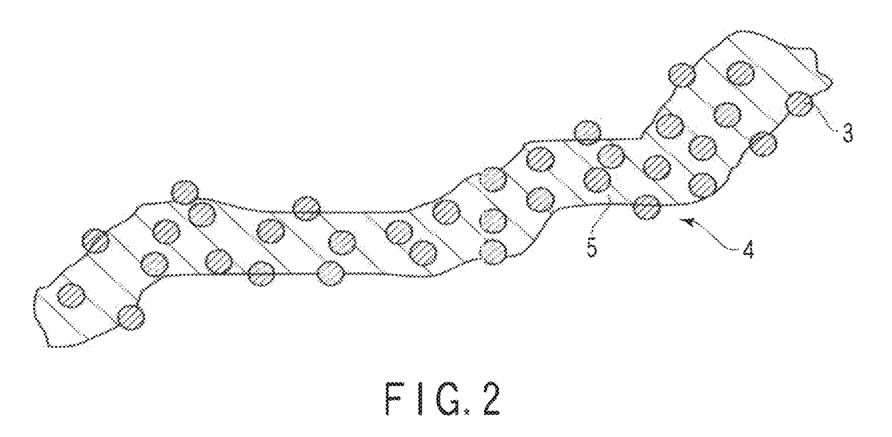
FIG. 2 is a schematic representation of a methanol oxidation catalyst according to another embodiment of the invention.
Figure 3:
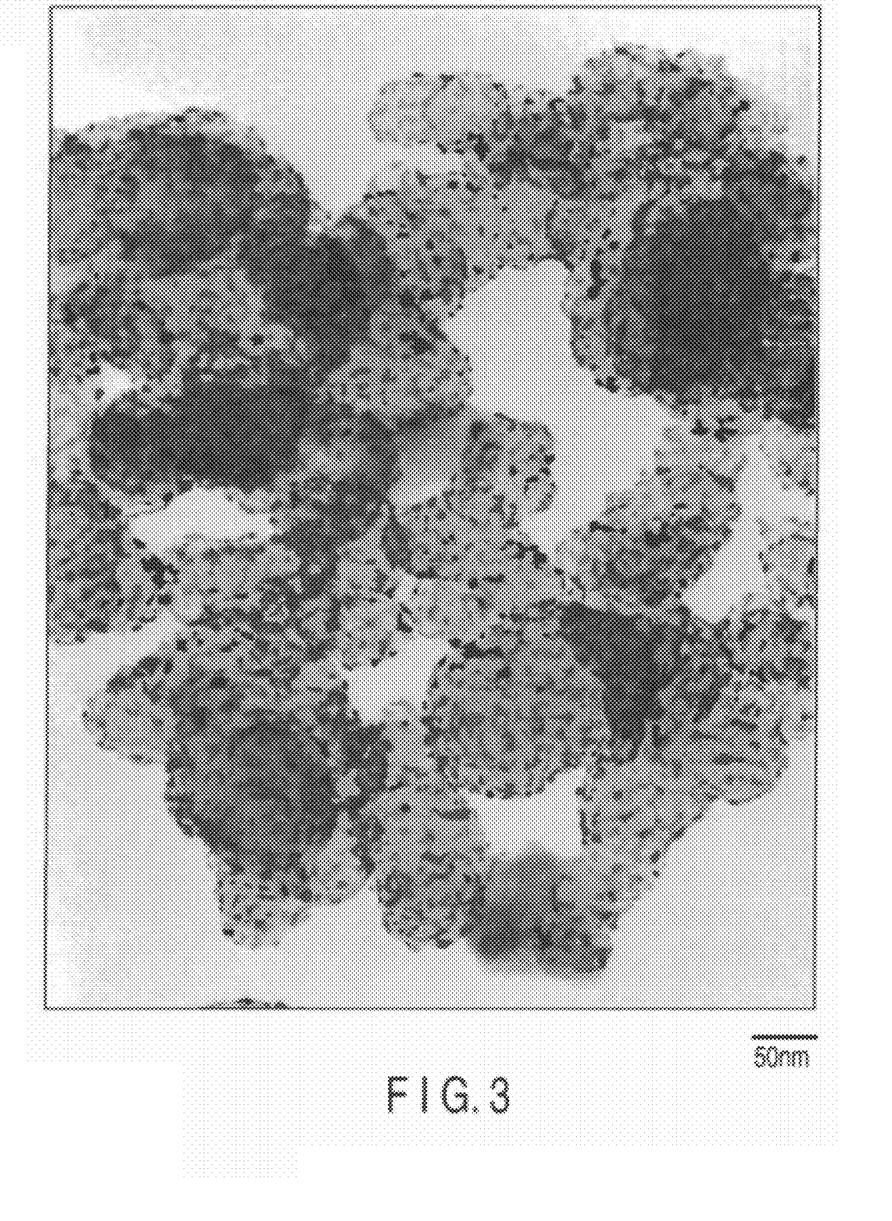
FIG. 3 is a TEM (Transmission Electron Microscopy) photograph of a methanol oxidation catalyst according to one embodiment of the invention.

As shown in FIG. 1, a carbon-supported catalyst 1 may be formed by supporting the catalyst particles (particles of Pt-M-Ta catalyst) 3 on carbon particles 2. The carbon particles act as a conductive support. Alternatively, as shown in FIG. 2, a carbon-supported catalyst 4 may be formed by supporting the catalyst particles 3 on a carbon nano-fiber 5 as the conductive support. FIG. 3 shows a TEM photograph of a catalyst layer composed of catalyst particles supported on carbon particles (carbon black). It will be appreciated that whilst carbon black is one example of a suitable conductive support material, the support material is not restricted thereto, and any support with excellent conductivity and stability may be used. For example, the conductive support can comprise, nano-carbon materials including those of fiber-form, tube-form or coil-form. These supports are different in surface state. The catalyst particles are further improved in activity when supported by these nano-carbon materials. Besides these carbon materials, conductive ceramics materials may be used as the support. In this case, a more synergetic effect of the ceramics support and the catalyst particles can be expected.

The methanol oxidation catalyst according to the invention can be manufactured by a sputtering method or a vapor deposition method. The inventors have found that these methods more readily produce a catalyst having a metal bond than "solution methods" such as an impregnation method, precipitation method or colloidal method. The solution methods not only entail high costs but also have difficulties in obtaining a desired bond state.

In a sputtering method or vapor deposition method, an alloy target may be used. Alternatively, each metal target can be made of a constituent element and the targets used to carry out simultaneous sputtering or simultaneous vapor deposition.

When a sputtering method is adopted, first, a particulate or fibrous conductive support material is dispersed over a sufficient surface area to receive the catalyst nanoparticles. Next:, the dispersed support is placed in a holder in a chamber of a sputtering apparatus and is then treated by sputtering To ensure the constituent metals of the catalyst adhere to the dispersed support, the target(s) and or the support is preferably rotated or otherwise moved during the deposition process. Movement of the target(s) and or support further ensures that the catalyst adheres uniformly to the support. The temperature of the support during sputtering is preferably maintained at 400° C. or less. When the temperature exceeds 400° C., phase separation of the catalyst particles can occur, resulting in a non-stabilized catalyst activity. In order to reduce the cost required to cool the support, the lower limit of the temperature of the support is preferably of the order of 10° C. The temperature of the support may be measured by a thermocouple.

The conductive support can comprise porous paper containing conductive carbon fibers, an electrode diffusion layer or an electrolytic membrane. It will be appreciated that since it is preferable to form the catalyst in the form of nanoparticles the process needs to be regulated accordingly. For the same reason as above, the temperature of the porous paper is desirably 400° C. or less.

After the catalyst particles are formed by a sputtering method or vapor deposition method the activity of the catalyst can be further improved by an acid washing treatment, alkali treatment or heat treatment. It is believed that such treatments can make the structure or surface structure of the catalyst into a more appropriate state.

In the acid washing treatment, an aqueous acid solution may be used and an aqueous sulfuric acid solution is exemplified as the aqueous acid solution. In the alkali treatment, an aqueous alkali solution may be used. Alternatively or in addition the structure or surface structure of the catalyst can be made into a more appropriate state by heat treatment. For example, the catalyst particles are preferably treated at 10 to 40° C. or less in an atmosphere where the partial pressure of oxygen is less than 5%.

To promote the formation of nanoparticles, other materials such as carbon may be deposited to the conductive support together with the constituent metal elements. Moreover, metals having high solubility, for example, Cu (copper), Zn (zinc) or Ni (nickel) and the structural metal elements may be sputtered or deposited simultaneously and then, Cu, Zn, Ni or the like can be removed by, for example, acid washing treatment.

Figure 4:
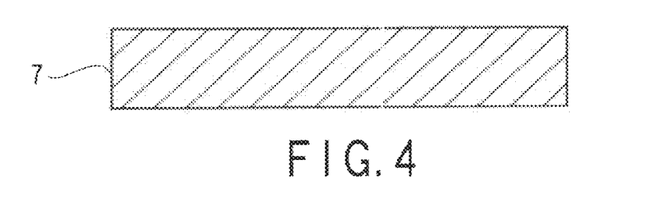
FIGS. 4 to 11 are schematic sectional representations showing a process of producing an electrode incorporating a methanol oxidation catalyst in accordance with the invention.
Figure 5:
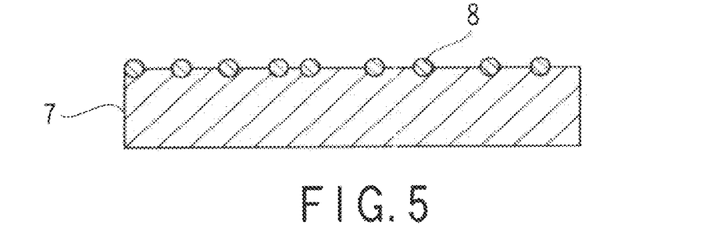
Figure 6:
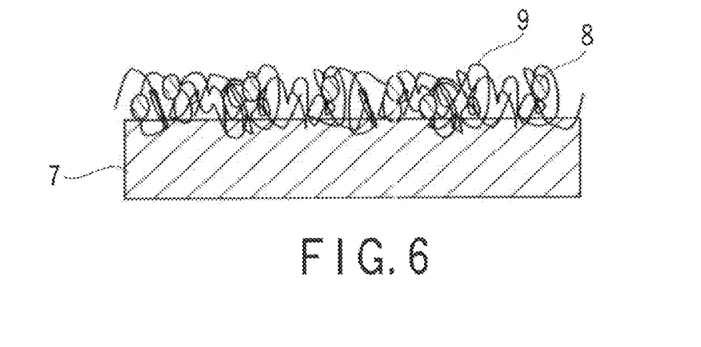

A method for manufacturing an electrode incorporating a methanol catalyst according to the invention will now be described with reference to FIGS. 4 to 11. First, as shown in FIG. 4, a carbon paper 7 is prepared and as shown in FIG. 5, Ni particles 8 are deposited to the surface of the carbon paper 7 by a sputtering method. Next, a carbon nano-fiber (CNF) layer 9 is, as shown in FIG. 6, synthesized in the presence of an ethylene/hydrogen ($C_2H_4/H_2$) atmosphere at 400 to 700° C.

Figure 7:
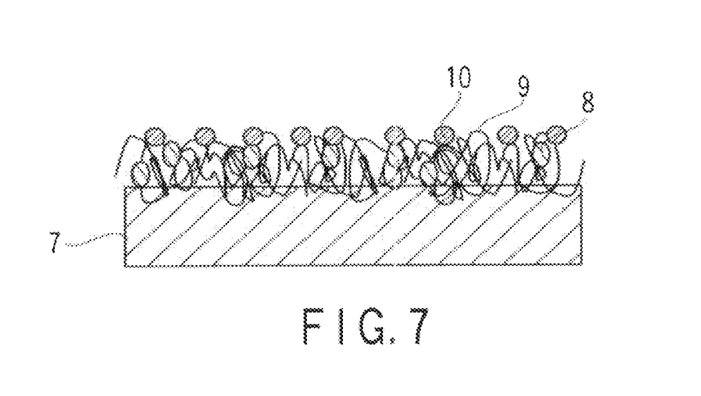
Figure 8:
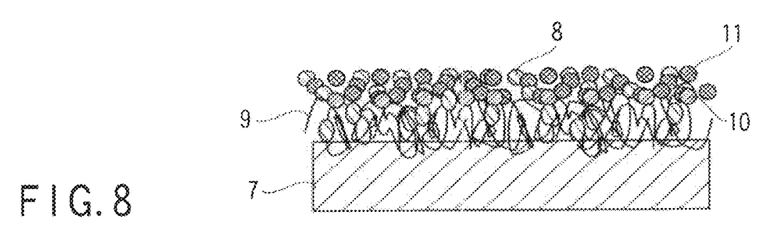
Figure 9:
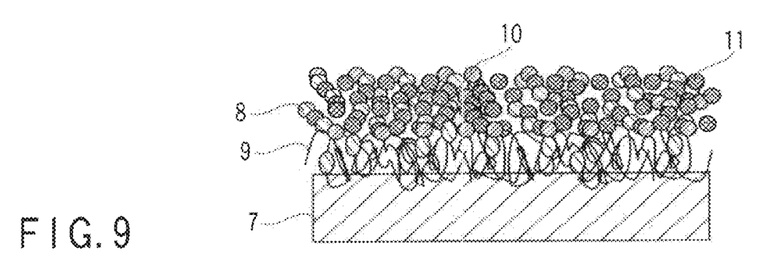

The CNF layer 9 is made to carry Pt particles 10 as shown in FIG. 7 by a sputtering method and then, carbon and nickel are sputtered simultaneously to make the CNF layer 9 carry carbon particles 11 and Ni particles 8 as shown in FIG. 8. This process is repeated to further laminate the Pt particles 10, carbon particles 11 and Ni particles 8 as shown in FIG. 9.

Figure 10:
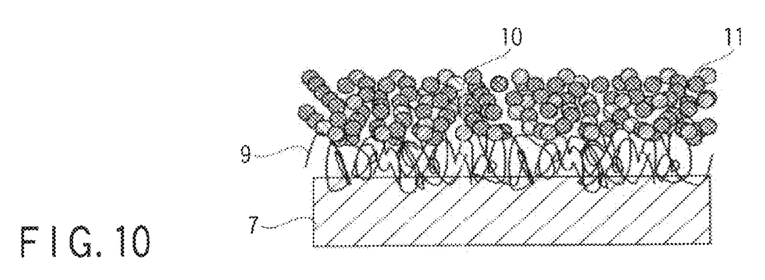
Figure 11:
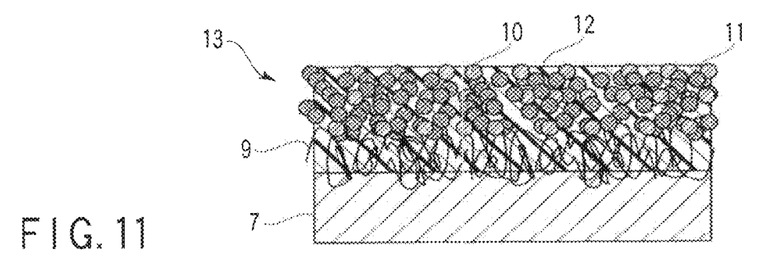

The Ni particles 8 are removed by treating with $H_2SO_4$ as shown in FIG. 10, followed by impregnating with Nafion® 12 under reduced pressure. As is known Nafion® is a proton exchange membrane material comprising a sulfonated tetrafluorethylene copolymer which is manufactured by Du Pont. A laminate type electrode 13 is obtained by the above steps.

The methanol oxidation catalyst according to the invention can be used as an anode electrode of a membrane electrode assembly (MEA). A proton conductive membrane is supported by and interposed between an anode electrode and a cathode electrode to constitute the MEA.

Any material can be used as the proton conductive material contained in the proton conductive membrane or the like without any particular limitation as long as it can conducts protons. Examples of the proton conductive material include fluororesins having a sulfonic acid group such as Nafion®, Flemion (manufactured by Asahi Kasei Corporation) and Aciplex® (manufactured by Asahi Chemical Glass Co., Ltd.) and inorganic materials such as tungstic acid and phosphotungstic acid.

A fuel cell can be manufactured by combining the MEA as mentioned above with means for supplying fuel to an anode electrode and means for supplying an oxidant to a cathode electrode. The number of MEAs used may be one or two or more. If a plurality of MEAs are used, a higher electromotive force can be obtained.

Examples of methanol oxidation catalysts in accordance with the invention will now be described. However, it will be appreciated that the present invention is not limited to these examples.

EXAMPLES 1 TO 17 COMPARATIVE EXAMPLES 1 to 7

A carbon black support (trade name: Vulcan XC72, manufactured by CABOT Corporation, specific surface area: about 230 m²/g) was thoroughly dispersed and filled in a holder. This holder was placed in a chamber of an ion-beam sputtering apparatus, and the chamber was evacuated. When the pressure in the chamber reached $3 \times 10^{-6}$ Torr or lower, Ar (argon) gas was flowed into the chamber.

The catalyst particles were adhered on the support by sputtering using a given target so that each composition of the catalyst shown in Table 2 is obtained. The target can be a metal target or an alloy target.

The support on which the catalyst particles were adhered was washed with an acid using an aqueous acid solution. The aqueous acid solution used was prepared by dissolving 10 g of sulfuric acid in 200 g of water. The support was further washed with water, and a methanol oxidation catalyst was obtained after drying.

COMPARATIVE EXAMPLE 8

An ethanol solution (1000 ml) containing vanadium chloride and tantalum chloride was prepared. The amount of metallic vanadium and the amount of metallic tantalum in the solution were 31.7 mg and 21.1 mg, respectively. Carbon black (500 mg, trade name: Vulcan XC72, manufactured by CABOT Corporation, specific surface area: about 230 m²/g) was added to the solution obtained, and was uniformly dispersed by through stirring. Ethanol was removed by evaporation thereafter by heating the solution at 55° C. with stirring.

Vanadium and tantalum were allowed to be supported on the carbon black by heating the residue at 300° C. for 3 hours while hydrogen gas was made to flow at a flow rate of 50 ml/min. Then, a cyclohexane solution (300 ml, the content of metallic platinum: 309 mg) containing 1,5-cyclooctadiene dimethyl platinum was prepared. The carbon black that retains vanadium and tantalum was added to the abovementioned solution, and was uniformly dispersed by stirring. The solvent was removed by evaporating the solvent by heating at 55° C. with stirring.

The residue obtained above was heated at 300° C. for 3 hours while hydrogen gas was allowed to flow at a flow rate of 50 ml/min. As a result, platinum, tantalum and vanadium were supported on the carbon black, and a methanol oxidation catalyst of Comparative Example 8 was obtained.

Each catalyst (Comparative examples 1 to 8) was subjected to XPS measurement using a PHI Quantum 2000 Scanning ESCA Microprobe. A neutralization gun was used for charge-up compensation and charge correction (Cls: C—C=284.6 eV). The peak of each element derived from a metal bond and the peak of each element derived from the oxygen bond were identified. The results are shown in Table 1.

TABLE 1

| | Range where peak exists (eV) | |
|---|---|---|
| Element | Metal bond | Oxygen bond |
| V | 512-513 (2p3/2) | 516-517 (2p3/2) |
| W | 31-34 (4f7/2) | 36-40 (4f5/2) |
| Mo | 227-228 (3d5/2) | 235-237 (3d5/2) |
| Nb | 202-203 (3d5/2) | NbO: 203-205 (3d3/2) |
| | | $Nb_2O_5$: 209-211 (3d5/2) |
| Cr | 574 (2p3/2) | 576-580 (2p3/2) |
| Zr | 178-179 (3d5/2) | $ZrO_2$: 184-185 (3d3/2) |
| Ti | 454 (2p3/2) | TiO: 455 (2p3/2) |
| | | $TiO_2$: 459* |
| Ta | 23-24 (4f7/2) | 27-29 (4f5/2) |
| Si | 99-100 (2p) | 103-104 (2p) |
| Al | 117-118 (2s) | 120-121 (2s) |
| Sn | 493-494 (3d3/2) | 494-496 (3d3/2) |
| Hf | 14-15 (4f7/2) | 17-19 (4f5/2) |

*This, however, cannot be seen highly possibly because this is overlapped on Ru.

For example, the peak having a bond energy of 512 to 514 eV and the peak having a bond energy of 516 to 518 eV were derived from the metal bond and oxygen bond, respectively, of V (vanadium) to 34 eV and the peak having a bond energy of 36 to using V2p spectrum. The peak having a bond energy of 31 40 eV were derived from the metal bond and oxygen bond, respectively, of W (tungsten) using W4f spectrum.

When the catalyst particles contain plural elements M, the most abundant element M is defined as major element M. The results of measurements of the major element M in each catalyst are summarized in Table 2. The peak area ratio of the major element M was defined as a peak area of the oxygen bond by defining the peak area of the metal bond of the element M as 1. The peak area ratio of Ta was defined as a peak area of the metal bond by defining the peak area of the oxygen bond of the Ta as 1.

TABLE 2

| | | Ratio of peak areas (%) | |
|---|---|---|---|
| | Catalyst Composition | Major element M* | Ta** |
| Example 1 | $Pt_{75}V_{15}Ta_{10}$ | 0.3 | 0.4 |
| Example 2 | $Pt_{40}V_{20}Ta_{40}$ | 0.3 | 0.4 |
| Example 3 | $Pt_{40}V_{55}Ta_5$ | 1.5 | 0.1 |
| Example 4 | $Pt_{98}V_{1.5}Ta_{0.5}$ | 0.3 | 0.3 |
| Example 5 | $Pt_{85}V_{10}Ta_5$ | 0.5 | 0.2 |
| Example 6 | $Pt_{70}V_{15}Ta_{10}Nb_5$ | 0.5 | 0.3 |
| Example 7 | $Pt_{50}Rh_{10}Ir_{10}W_{20}Ta_{10}$ | 0.4 | 0.4 |
| Example 8 | $Pt_{70}W_{18}Ta_{12}$ | 0.4 | 0.3 |
| Example 9 | $Pt_{65}W_{20}Ta_{10}Ti_5$ | 0.5 | 0.5 |
| Example 10 | $Pt_{70}Ni_{15}W_5Ta_5Cr_5$ | 0.6 | 0.3 |
| Example 11 | $Pt_{80}Mo_{15}Ta_5$ | 0.6 | 0.3 |
| Example 12 | $Pt_{80}Mo_{10}Ta_{10}$ | 0.5 | 0.3 |
| Example 13 | $Pt_{65}Ni_{25}Ta_{10}$ | 0.7 | 0.3 |
| Example 14 | $Pt_{75}Ni_{15}Ta_{10}$ | 0.6 | 0.4 |
| Example 15 | $Pt_{60}Ni_{20}Ta_{10}Hf_{10}$ | 0.5 | 0.3 |
| Example 16 | $Pt_{75}Ni_{15}Ta_5Zr_5$ | 0.5 | 0.3 |
| Example 17 | $Pt_{60}Ni_{10}Ta_{10}Sn_{20}$ | 0.5 | 0.4 |

TABLE 2-continued

| Catalyst Composition | Ratio of peak areas (%) | |
|---|---|---|
| | Major element M* | Ta** |
| Comparative Example 1 | $Pt_{50}Ru_{50}$ | — | — |
| Comparative Example 2 | $Pt_{90}V_{10}$ | 0.4 | — |
| Comparative Example 3 | $Pt_{30}V_{20}Ta_{50}$ | 0.4 | 0.2 |
| Comparative Example 4 | $Pt_{98}Ta_2$ | — | 0.5 |
| Comparative Example 5 | $Pt_{30}V_{60}Ta_{10}$ | 0.9 | 0.4 |
| Comparative Example 6 | $Pt_{98.5}V_1Ta_{0.5}$ | 0.2 | 0.1 |
| Comparative Example 7 | $Pt_{49.7}V_{50}Ta_{0.3}$ | 0.8 | 0.4 |
| Comparative Example 8 | $Pt_{75}V_{15}Ta_{10}$ Solution method | No peak of metal bond | No peak of metal bond |

*Ratio of the peak derived from the oxygen bond of the M-element to the peak derived from the metal bond of the M-element.
**Ratio of the peak derived from the metal bond of the Ta-element to the peak derived from the oxygen bond of the Ta-element.

As shown in Table 2, the peak area derived from the oxygen bond of each major element M is twice or less of the peak area derived from the metal bond of the same element, and the peak area derived from the metal bond of Ta is twice or less of the peak area of the oxygen bond of the same element in the XPS spectrum of all the catalysts in the examples. On the contrary, most of the bonds of the element M and Ta were those of oxidized states in Comparative Example 8 using the solution method.

The samples subjected to the above mentioned measurements were catalysts after washing with an acid. The catalyst before acid washing sometimes have a higher peak of the oxygen bond than the catalyst after washing. This can be attributed to the presence of unstable oxide layers. The unstable oxide layer in the catalyst not subjected to acid washing may change during power generation, and the ratio of the peak area derived from the oxygen bond tends to be the same level as the catalyst after washing with the acid.

Then, an MEA was constructed using each catalyst in the examples and comparative examples as an anode catalyst, and fuel cells produced by using the MEA were evaluated.

For producing an anode electrode slurry is prepared by thoroughly mixing, with stirring, each catalyst (3 g), pure water (8 c), 20% Nafion solution (15 g) and 2-ethoxyethanol (30 g). The slurry was then applied to a carbon paper (350 μm, manufactured by Toray), subjected to water repellent finish with a control coater followed by drying. An anode electrode with a loading density of a noble metal catalyst of 1 mg/cm$^2$ was thus obtained.

A Pt catalyst was used for producing a cathode electrode. A slurry is prepared by thoroughly mixing the Pt catalyst (2 g, manufactured by Tanaka Kikinzoku), pure water (5 g), 20% Nafion solution (5 g) and 2-ethoxyethanol (20 g). The slurry is applied to a carbon paper (350 μm, manufactured by Toray), subjected to water repellent finish with a control coater followed by drying. A cathode electrode with a loading density of a noble metal catalyst of 2 mg/cm$^2$ was thus obtained.

The cathode electrode and anode electrode were cut into squares of 3.2×3.2 cm so that the electrode area is 10 cm$^2$. Nafion 117 (manufactured by DuPont) as a proton conductive solid polymer membrane was interposed between the cathode electrode and anode electrode, and a membrane-electrode assembly was manufactured by press-bonding by heating. The press-bonding condition was at a temperature of 125° C. for 10 minutes and a press-bonding pressure of 30 kg/cm$^2$.

A unit cell of a fuel direct feed type polymer electrolyte fuel cell was manufactured by using the membrane-electrode assembly obtained and a flow-passage plate. Aqueous 1M methanol solution as fuel was supplied to the anode electrode at a flow rate of 0.6 ml/min, while air as an oxidant was supplied to the cathode electrode at a flow rate of 200 ml/min. A current with a current density of 150 mA/cm$^2$ was discharged while the cell is maintained at 65° C., and a cell voltage was measured after 30 minutes. The rate of decrease in the voltage at a current density of 150 mA/cm$^2$ was also measured after operating the unit cell for 800 hours under the same condition. The results obtained are shown as deterioration ratios in Table 3 together with the voltage.

Comparisons between Comparative Example 1 using only Pt and Ru and Examples 1 to 17 show that durability is enhanced in the catalysts in Examples 1 to 17 with the same level of activity. Comparisons between Examples 1 to 3 and Comparative Examples 2 and 4 show that high stability w th a rate of deterioration of 8% or less is obtained while high activity is maintained by adding V and Ta.

TABLE 3

| | Voltage (V) | Rate of deterioration (%) |
|---|---|---|
| Example 1 | 0.51 | 5 |
| Example 2 | 0.46 | 8 |
| Example 3 | 0.47 | 7 |
| Example 4 | 0.47 | 7 |
| Example 5 | 0.47 | 7 |
| Example 6 | 0.49 | 7 |
| Example 7 | 0.48 | 6 |
| Example 8 | 0.49 | 6 |
| Example 9 | 0.50 | 6 |
| Example 10 | 0.51 | 5 |
| Example 11 | 0.53 | 7 |
| Example 12 | 0.49 | 6 |
| Example 13 | 0.50 | 7 |
| Example 14 | 0.51 | 8 |
| Example 15 | 0.48 | 6 |
| Example 16 | 0.48 | 8 |
| Example 17 | 0.49 | 8 |
| Comparative Example 1 | 0.50 | 16 |
| Comparative Example 2 | 0.37 | 13 |
| Comparative Example 3 | 0.32 | 11 |
| Comparative Example 4 | 0.32 | 12 |
| Comparative Example 5 | 0.30 | 12 |
| Comparative Example 6 | 0.28 | 8 |
| Comparative Example 7 | 0.35 | 10 |
| Comparative Example 8 | 0.38 | 15 |

High stability with a rate of deterioration of 8% or less is not compatible with high activity when the content of the element M is less than 1.5 at. % or exceeds 55 at. %. Also, high stability with a rate of deterioration of 8% or less s not compatible with high activity when the content of Ta is less than 0.5 at. % or exceeds 40 at. %. This may be concluded from the comparison between Examples 1 to 17 and Comparative Examples 3 to 7.

It was confirmed from the comparison between Examples 1 to 3 and Comparative Example 8 that not only the composition but also bonding states of the elements need to be regulated to obtain high activity.

While the above mentioned results have been confirmed with respect to the combination of elements Pt—V—Ta, the same results were obtained with respect to combinations of elements Pt—W—Ta, Pt—Ni—Ta, and Pt—Mo—Ta.

The same tendency as described above was confirmed when the methanol oxidation catalyst in the examples was applied to a reformed gas type polymer electrolyte fuel cell. Accordingly, the methanol oxidation catalyst according to the invention may be more effective than the Pt catalyst in the related art for preventing CO poisoning.

Since the catalyst according to the invention has high activity with high stability, a high output fuel cell may be produced using the catalyst.

The present invention is not limited to the aforementioned embodiments and the constituent elements may be modified and embodied within the scope of the invention. It will be appreciated that appropriate combinations of plural constituent elements disclosed in the above embodiments enable the production of various catalysts in accordance with the invention. For example, several constituent elements may be deleted from all the constituent elements shown in the embodiments. Also, the constituent elements common to different embodiments may be appropriately combined.

The catalysts of the present invention provide a highly active methanol oxidation catalyst and a method for producing the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A methanol oxidation catalyst composition comprising:

$$(Pt_{1-s}N_s)_x(M_{1-t}A_t)_zTa_u$$

wherein:
N is at least one noble metal selected from the group consisting of Rh, Os, Ir, Pd, Ag, and Au;
M is at least one element selected from the group consisting of V, W, Ni, and Mo;
A is at least one element selected from the group consisting of Sn, Hf, Ti, Cr, Al, Si, Nb, and Zr;
x is 40-98 at. %;
z is 1.5-55 at. %;
u is 0.5-40 at. %;
s is 0-0.29;
t is 0-0.80;
x expresses the atomic concentration of Pt, z expresses the atomic concentration of M, u expresses the atomic concentration of Ta, s expresses the atomic concentration of N, and t expresses the atomic concentration of A;
x+z+u=100 at. %; and
the methanol oxidation catalyst composition does not comprise Ru.

2. The methanol oxidation catalyst composition according to claim 1, wherein a proportion of Pt is substituted with N.

3. The methanol oxidation catalyst composition according to claim 1, wherein a proportion of M is substituted with A.

4. The methanol oxidation catalyst composition according to claim 1, wherein z is 5-40 at. %.

5. The methanol oxidation catalyst composition according to claim 1, wherein u is 1-15 at. %.

6. The methanol oxidation catalyst composition according to claim 1, wherein at. % values of x, z and u are selected such that M exhibits X-ray photoelectron spectroscopy peaks derived from an oxygen bond and a metal bond in which a peak area derived from the oxygen bond is twice or less of a peak area derived from the metal bond.

7. The methanol oxidation catalyst composition according to claim 1, which is in the form of a nanoparticle.

8. The methanol oxidation catalyst composition according to claim 1, which is in the form of a nanoparticle having an average particle diameter of 10 nm or less.

9. The methanol oxidation catalyst composition according to claim 1, which is in the form of a nanoparticle having an average particle diameter of 0.5 nm or more.

10. The methanol oxidation catalyst composition according to claim 1, which is in the form of a nanoparticle having an average particle diameter of 0.5-10 nm.

11. The methanol oxidation catalyst composition according to claim 1, which is in the form of a nanoparticle supported on a conductive support material.

12. The methanol oxidation catalyst composition according to claim 1, which is in the form of a nanoparticle supported on a conductive support material selected from the group consisting of a carbon material and a ceramic material.

13. The methanol oxidation catalyst composition according to claim 1, which is in the form of a nanoparticle supported on a conductive support material, wherein the conductive support material is a carbon material which is in a form selected from the group consisting of a fiber, a tube, and a coil.

14. A methanol oxidation catalyst represented by the following formula:

$$(Pt_{1-s}N_s)_x(M_{1-t}A_t)_zTa_u$$

wherein:
N is at least one noble metal selected from the group consisting of Rh, Os, Ir, Pd, Ag, and Au;
M is at least one element selected from the group consisting of V, W, Ni, and Mo;
A is at least one element selected from the group consisting of Sn, Hf, Ti, Cr, Al, Si, Nb, and Zr;
x is 40-98 at. %;
z is 1.5-55 at. %;
u is 0.5-40 at. %;
s is 0-0.29;
t is 0-0.80;
x expresses the atomic concentration of Pt, z expresses the atomic concentration of M, u expresses the atomic concentration of Ta, s expresses the atomic concentration of N, and t expresses the atomic concentration of A; and
x+z+u=100 at. %.

15. The methanol oxidation catalyst according to claim 14, wherein a proportion of Pt is substituted with N.

16. The methanol oxidation catalyst according to claim 14, wherein a proportion of M is substituted with A.

17. The methanol oxidation catalyst according to claim 14, wherein z is 5-40 at. %.

18. The methanol oxidation catalyst according to claim 14, wherein u is 1-15 at. %.

19. The methanol oxidation catalyst according to claim 14, wherein at. % values of x, z and u are selected such that M exhibits X-ray photoelectron spectroscopy peaks derived from an oxygen bond and a metal bond in which a peak area derived from the oxygen bond is twice or less of a peak area derived from the metal bond.

20. The methanol oxidation catalyst according to claim 14, which is in the form of a nanoparticle.

21. The methanol oxidation catalyst according to claim 14, which is in the form of a nanoparticle having an average particle diameter of 10 nm or less.

22. The methanol oxidation catalyst according to claim 14, which is in the form of a nanoparticle having an average particle diameter of 0.5 nm or more.

23. The methanol oxidation catalyst according to claim 14, which is in the form of a nanoparticle having an average particle diameter of 0.5-10 nm.

24. The methanol oxidation catalyst according to claim 14, which is in the form of a nanoparticle supported on a conductive support material.

25. The methanol oxidation catalyst according to claim 14, which is in the form of a nanoparticle supported on a conductive support material selected from the group consisting of a carbon material and a ceramic material.

26. The methanol oxidation catalyst according to claim 14, which is in the form of a nanoparticle supported on a conductive support material, wherein the conductive support material is a carbon material which is in a form selected from the group consisting of a fiber, a tube, and a coil.

27. A method of manufacturing the methanol oxidation catalyst according to claim 24, wherein the method comprises:
    maintaining the conductive support material at a temperature of 400° C. or less; and
    depositing Pt, M and Ta onto the conductive support material by sputtering or vacuum deposition to form nanoparticles of the methanol oxidation catalyst on the conductive support material.

28. The method according to claim 27, wherein said depositing further comprises depositing N and/or A onto the conductive support material by sputtering or vacuum deposition to form nanoparticles of the methanol oxidation catalyst on the conductive support material.

29. The method according to claim 27, wherein the method further comprises treating the nanoparticles with at least one treatment selected from the group consisting of washing the nanoparticles with an acid, washing the nanoparticles with an alkali, and treating the nanoparticles with heat.

30. The method according to claim 27, wherein the method further comprises treating the nanoparticles with heat at a temperature of 10-400° C. under an oxygen partial pressure of less than 5%.

31. The method according to claim 27, wherein the method further comprises adhering an additional material on the conductive support material by sputtering or vacuum deposition.

32. The method according to claim 27, wherein the method further comprises adhering a soluble metal on the conductive support material by sputtering or vacuum deposition; and removing the soluble metal by an acid washing treatment.

* * * * *